United States Patent [19]

Kunikata et al.

[11] Patent Number: 5,661,705
[45] Date of Patent: Aug. 26, 1997

[54] OPTICAL DISK PICKUP CONTROL APPARATUS AND METHOD PROVIDING STABILIZED SEARCH OPERATIONS

[75] Inventors: Norikazu Kunikata, Musashino; Tatsuya Murata, Tokorozawa, both of Japan

[73] Assignee: TEAC Corporation, Japan

[21] Appl. No.: 548,332

[22] Filed: Nov. 1, 1995

[30] Foreign Application Priority Data

Nov. 8, 1994 [JP] Japan ................................. 6-274099

[51] Int. Cl.[6] ..................................................... G11B 7/00
[52] U.S. Cl. ................................... 369/44.28; 369/32
[58] Field of Search ........................... 369/44.28, 44.29, 369/44.34, 32, 78.04, 78.05

[56] References Cited

U.S. PATENT DOCUMENTS

| | | | |
|---|---|---|---|
| 4,748,607 | 5/1988 | Nakane | 369/44.28 X |
| 4,774,699 | 9/1988 | Giddings | 369/32 |
| 4,935,712 | 6/1990 | Abe et al. | 360/78.04 |
| 5,471,444 | 11/1995 | Wachi | 369/44.28 X |

FOREIGN PATENT DOCUMENTS 3-16066   1/1991   Japan .

*Primary Examiner*—Aristotelis M. Psitos
*Assistant Examiner*—Thang V. Tran
*Attorney, Agent, or Firm*—Andrus, Sceales, Starke & Sawall

[57] ABSTRACT

An optical disk drive is provided with a microcomputer for calculating the number of tracks on an optical disk traversed by an optical pickup in a seek operation and the number of steps to be taken in the seek operation. The number of steps determined in accordance with a signal output by a rotation detector of a feed motor is incremented or decremented depending on a direction in which the optical pickup is translated, and is preset in a counter. In each step of a seek operation, the optical pickup is driven by the feed motor in accordance with the count of the counter.

4 Claims, 9 Drawing Sheets

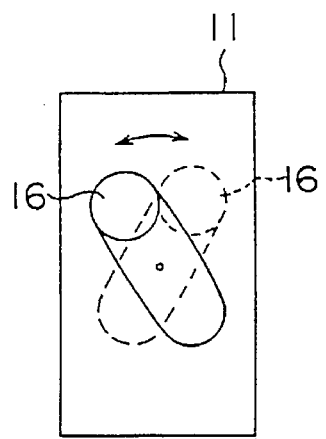
FIG. 4A PRIOR ART
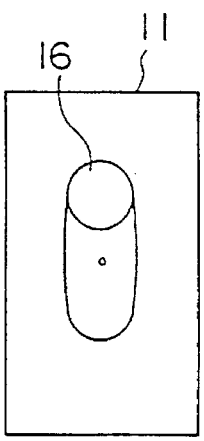
FIG. 4B PRIOR ART
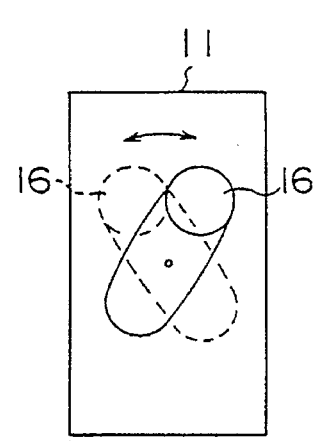
FIG. 4C PRIOR ART
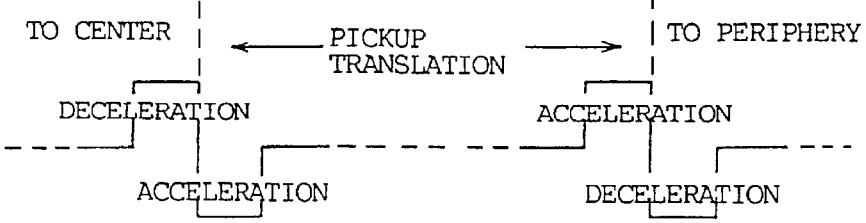
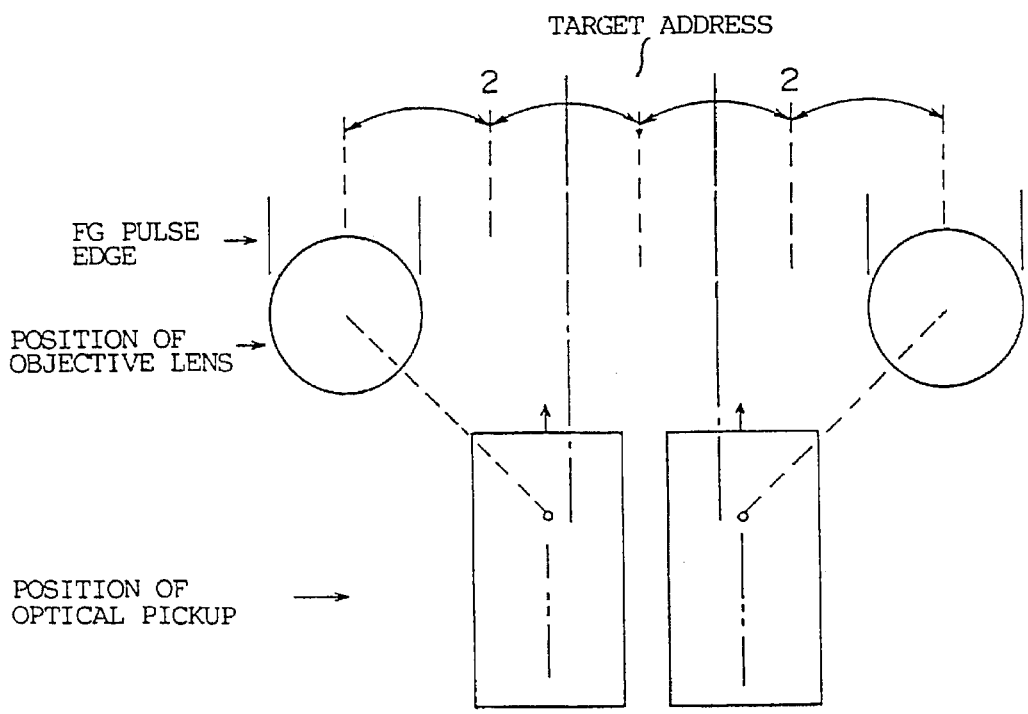
FIG. 5 PRIOR ART

OPTICAL DISK PICKUP CONTROL APPARATUS AND METHOD PROVIDING STABILIZED SEARCH OPERATIONS

BACKGROUND OF THE INVENTION

1. Field of the Invention

The present invention relates to optical disk drives and more particularly to an optical disk drive in which information is read/written by translating an optical pickup in a radial direction of an optical disk.

2. Description of the Prior Art

Optical disk drives for driving optical disks such as a compact disk (CD), a magneto-optical disk and a mini disk (MD) are provided with an optical pickup for illuminating an optical disk with a laser beam and receiving light reflected by the optical disk.

FIG. 1 shows a construction of an optical pickup mounted on a conventional optical disk drive. In an optical pickup 11 shown in FIG. 1, a laser beam $12_a$ emitted by a semiconductor laser (light source) 12 passes through a beam splitter 14 via a coupling lens 13 and is incident on an optical disk 17 via a quarter-wave plate 15 and an objective lens 16.

Light reflected by the optical disk 17 travels through the objective lens 16 and the quarter-wave plate 15, and has its course changed by the beam splitter 14. The reflected light is caught by a first photosensitive element (photodiode) 19 via a convergent lens 18. A portion of the reflected light is caught by a second photosensitive element 23 via a reflecting mirror 20.

The objective lens 16 is provided with a coil 21 acting as an actuator that realizes tracking servo operation, and a coil 22 that realizes focusing servo operation.

FIG. 2 is a diagram showing a principal idea behind an operation for driving the optical pickup of FIG. 1. Referring to FIG. 2, the optical pickup 11 is engaged with and guided by guide shafts $23_a$ and $23_b$ provided to lie in a direction in which the optical pickup 11 is translated. A rack 24 is formed at an end of the optical pickup 11.

A driving gear 26 is fitted to a rotation shaft $25_a$ of a motor 25 for driving the optical pickup 11. The driving gear 26 is engaged with a pinion 28 via gears $27_a$ and $27_b$. The pinion 28 is engaged with the rack 24 of the optical pickup 11 so as to transmit a driving force. As a result, the optical pickup 11 is translated in a radial direction of the optical disk 17 along the guide shafts $23_a$ and $23_b$.

A flexible printed circuit board 29 transmits a servo signal and the like.

In a write mode, the optical pickup 11 projects the high-power laser beam $12_a$ from the semiconductor laser 12 on to the optical disk 17 embodied, for example, by a magneto-optic disk or an MD. Writing operation is effected by magnetizing a reflecting surface of the optical disk 17 with a magnetic head (not shown).

In a read mode, the optical disk 11 projects the low-power laser beam $12_a$ on to the optical disk 17 (such as a compact disk). Reading is effected by demodulating reflected light caught by the first photosensitive element 19. An output signal of the first photosensitive element 19 is used in focusing servo operation and a restored data signal is derived from an output from the second photosensitive element 23.

While FIG. 1 shows an optical system for a main beam, the optical pickup 11 is also provided with two optical systems for a side beam. These additional optical systems are employed to generate an error signal for use in tracking servo operation.

FIG. 3 is a flowchart showing a conventional operation for causing the optical pickup 11 to jump across tracks. Referring to FIG. 3, when a host system issues a seek command for initiating a search, the motor 25 is driven so as to translate the optical pickup 11 to an initially set (S1) position. The optical pickup 11 then reads its current address (S2), and calculates the number of tracks to be traversed before reaching a target address based on the address read (S3).

A determination is then made as to whether or not the number of tracks to be traversed in a seek operation is zero (S4). If the number of tracks to be traversed is zero, that is, if it is found that the optical pickup 11 is already located on a target track, the search operation is terminated.

If the number of tracks to be traversed is not zero, a determination is made as to whether or not the actuator embodied by the coil 21 in the optical pickup 11 is capable of effecting a jump across the tracks determined to be traversed (S5). If the actuator is not able to effect a necessary jump, the number of steps required in a seek operation using the motor 25 and a thread mechanism (rack-and-pinion mechanism) is calculated (S6). A seek operation involving the calculated number of steps is executed and the control is returned to S2 (S7).

If it is found fin S5 that the actuator is capable of effecting a necessary jump across tracks, the coil 21 is fed a current so that a track jump using the actuator is carried out and the control is returned to S2 (S8).

Japanese Laid-Open Patent Application No. 3-16066 discloses a method for effecting a track jump. In the method disclosed in Japanese Laid-Open Patent Application No. 3-16066, a yoke of a feed motor (which corresponds to the motor 25 shown in FIG. 2) of an optical pickup is provided with not only a driving coil but also a Hall element for detecting rotation. Accordingly, a signal indicating a position is obtained by detecting rotation of a magnet provided in a rotor.

More specifically, a microcomputer provided in a disk drive calculates a position of a current track based on a linear velocity of the optical disk so as to determine the number of tracks to be traversed before a target address is reached. The number of steps to be executed in a translation is preset in a counter provided in the microcomputer. In accordance with FG pulses output from the Hall element in response to the rotation of the feed motor, the count of the counter is decremented. A velocity of the feed motor is controlled according to velocity data associated with the count so that the operation of the motor is stopped when the count reaches zero.

For example, assuming that 100 tracks exist in an interval between FG pulse edges and a track pitch is 1.6 µm, position of the optical pickup is controlled with a 160 µm resolution. Fine adjustment within the 160 µm range is effected by a track jump using an actuator, based on a track count.

In this way, an accurate track jump can be effected without using a track count obtained by the optical pickup.

It is to be noted in a track jump method disclosed in Japanese Laid-Open Patent Application No. 3-16066 that the optical pickup is stopped when it is found that FG pulses has brought the count to zero. However, it is difficult to stop the optical pickup at a pulse edge. The optical pickup may stop at a position past the pulse edge.

FIG. 4 explains how the objective lens is moved in an access operation. FIGS. 5 and 6 explain problems with the conventional technology.

As shown in (A)–(C) of FIG. 4, the optical pickup 11 is translated either toward a center or a periphery of the optical disk so as to reach a target position. In its movement, the optical pickup 11 undergoes a violent acceleration and deceleration according to velocity data. Moreover, since tracking servo operation using an actuator is OFF during an access operation, the objective lens 16 undergoes a swinging motion in the access operation. Thus, in many cases, the objective lens 16 is displaced in an access direction when the optical pickup 11 comes to a halt. Specifically, the objective lens 16 may be displaced from a center of the optical pickup 11 by a distance corresponding to several FG pulses (200–300 μm).

The optical pickup 11 reads an address of the displaced position, resulting in an erroneous identification of the position. The feed motor 25 is driven so that the optical pickup 11 is translated backward, producing another displacement of the objective lens 16 in an access direction. As shown in FIG. 5, this may result in the optical pickup 11 being moved endlessly by the motor 25.

Physically, the FG pulse edge does not always coincide with the track on the optical disk 17. There is a variation in the number of tracks existing between FG pulses, even more so when an eccentricity of the optical disk 17 exists. Thus, an error may exit between the driving of the pickup 11 by the motor 25 according to the pulse count and the actual movement of the pickup 11. Consequently, the seek operation may be repeated in four to six steps.

Further, the rotation shaft $25_a$ may be twisted in a counter direction after the optical pickup 11 comes to a halt, due to a cogging (a backlash caused by the gears $27_a$ and $27_b$, and the pinion 28) of the feed motor 25. As shown in FIG. 6, if the number of tracks existing between an address read in the position shown in FIG. 6 and a target address corresponds to one step of the FG pulse or more, the feed motor 25 is activated and stopped in response to a pulse edge. If another backward twist of the rotation shaft $25_a$ occurs, the seek operation for one step is repeated.

SUMMARY OF THE INVENTION

Accordingly, an object of the present invention is to provide an optical disk drive and a tracking control method in which the aforementioned problems are eliminated.

Another and more specific object of the present invention is to provide an optical disk drive and a tracking control method, in which a search operation of an optical pickup is stabilized.

In order to achieve the aforementioned objects, the present invention provides an optical disk drive in which information is written and read by translating an optical pickup provided with an optical mechanism in its main body in a radial direction of an optical disk, and executing focusing control and tracking control on a target track, the optical disk drive comprising:

control means calculating the number of tracks to be traversed by the optical pickup based on an address of a current position on the optical disk of the optical pickup and a target address, and calculating the number of steps to be taken in translating the main body of the optical pickup based on the calculated number of tracks to be traversed, a predetermined number of tracks constituting one step;

detecting means detecting the number of steps taken by the main body of the optical pickup;

driving means effecting a track jump of the optical mechanism of the optical pickup based on a tracking error signal detected by the optical pickup from the optical disk;

adding/subtracting means modifying the number of steps to be taken in translating the main body of the optical pickup depending on a direction in which the main body of the optical pickup is translated; and translating means translating, based on a position of the optical pickup determined from a signal from the detecting means, the main body of the optical pickup to a position in the vicinity of a target address from which position it is possible for the driving means to move the optical pickup to a target address, the number of steps to be taken in the translation being calculated by the control means and modified by the adding/subtracting means.

The aforementioned objects can also be achieved by a tracking control method in which information is written and read by translating an optical pickup provided with an optical mechanism in its main body in a radial direction of an optical disk, and executing focusing control and tracking control on a target track, the tracking control method comprising the steps of:

a) calculating the number of tracks to be traversed by the optical pickup based on an address of a current position on the optical disk of the optical pickup and a target address, and translating the optical pickup;

b) determining whether or not it is possible to effect a track jump of the optical mechanism of the optical pickup based on a tracking error signal detected by the optical pickup from the optical disk;

c) calculating, when it is impossible to effect a track jump, the number of steps to be taken in translating the main body of the optical pickup, a predetermined number of tracks constituting one step; and d) subtracting a predetermined number from the number of steps calculated in step c), when the main body of the optical pickup is translated in opposite directions successively, and adding a predetermined number to the number of steps calculated by the control means, when the main body of the optical pickup is translated in the same direction successively.

According to the optical disk drive and the tracking control method of the present invention, the control means calculates the number of tracks to be traversed by the optical pickup, whereupon translating means moves the optical pickup. A determination is then made as to whether or not it is possible for the driving means to effect a track jump. If a track jump is not possible, the number of steps to be taken in the movement is calculated. Depending on the direction in which the optical pickup is moved, the number of steps to be taken in the movement is adjusted by adding thereto or subtracting therefrom a predetermined number. In this way, it is possible to settle the optical pickup in a target position through the adjusted number of steps and stabilize the search operation of the optical pickup.

BRIEF DESCRIPTION OF THE DRAWINGS

Other objects and further features of the present invention will be apparent from the following detailed description when read in conjunction with the accompanying drawings, in which:

FIG. 4 explains how an objective lens is moved in an access operation;

FIG. 5 is a diagram (1) explaining a problem with the conventional technology:

DESCRIPTION OF THE PREFERRED EMBODIMENTS

Figure 7:
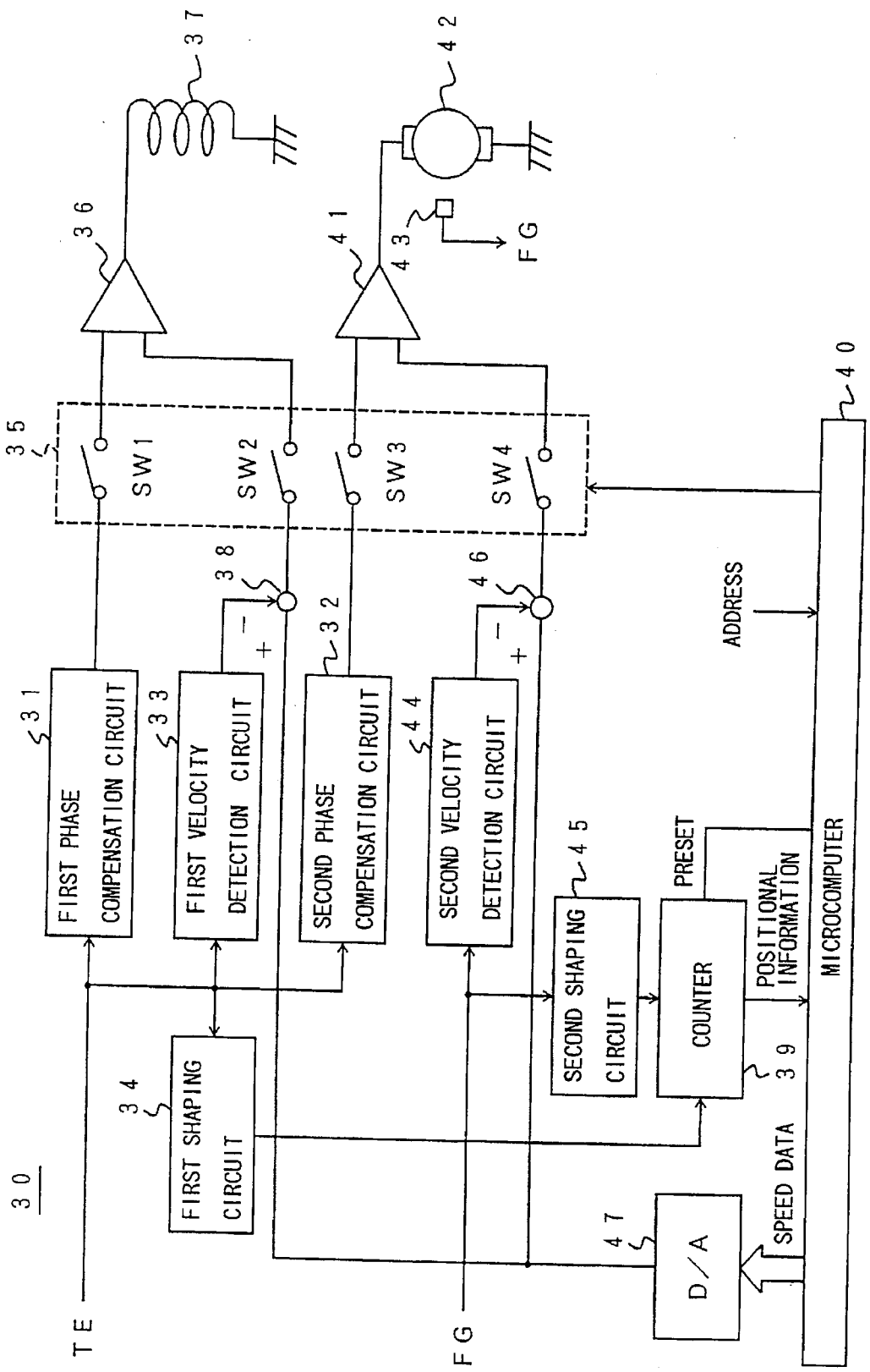
FIG. 7 shows a construction of a main part of an embodiment of the present invention.

FIG. 7 shows a construction of a main part of an embodiment of the present invention. More specifically, FIG. 7 is a block diagram showing a construction of a pickup servo circuit 30 for an optical disk drive described later. A tracking error signal TE detected by an optical pickup from an optical disk is fed to first and second phase compensation circuits 31 and 32, a first velocity detection circuit 33 and a first shaping circuit 34.

An output of the first phase compensation circuit 31 is fed to a driver 36 via a switch SW 1 of a switch circuit 35 for tracking servo operation. An output of the driver 36 drives a coil 37 (driving means) provided in the optical pickup. An output of the first velocity detection circuit 33 is fed to a first subtracter 38.

The first shaping circuit 34 shapes the TE signal and feeds the same to a counter 39 (adding/subtracting means). The counter 39 feeds its count to a microcomputer 40 as positional information. An output of the second phase compensation circuit 32 is fed to a driver 41 via a switch SW 2 of the switch circuit 35 for a reading operation. An output of the driver 41 drives a feed motor 42 (translating means) for translating the optical pickup.

An FG signal from a rotation detector (Hall element) 43 (detecting means) provided in the vicinity of the feed motor 42 is fed to a second velocity detection circuit 44 and a second shaping circuit 45. An output of the second velocity detection circuit 44 is fed to a second subtracter 46. The second shaping circuit 45 shapes the FG signal and feeds the same to the counter 39. The counter 39 feeds its count to the microcomputer 40 as positional information. A preset signal is fed from the microcomputer 40 to the counter 39.

Velocity data output by the microcomputer 40 is converted into an analog signal by a D/A (digital/analog) conversion circuit 47 and fed to the first and second subtracters 38 and 46. An address signal relating to a current position is fed from the optical pickup to the microcomputer 40.

An output of the first subtracter 38 is fed to the driver 36 via the switch SW 2 for a track jump operation. An output of the second subtracter 46 is fed to the driver 41 via a switch SW 4 for a seek operation.

The switch circuit 35 is controlled by the microcomputer 40.

Figure 1:
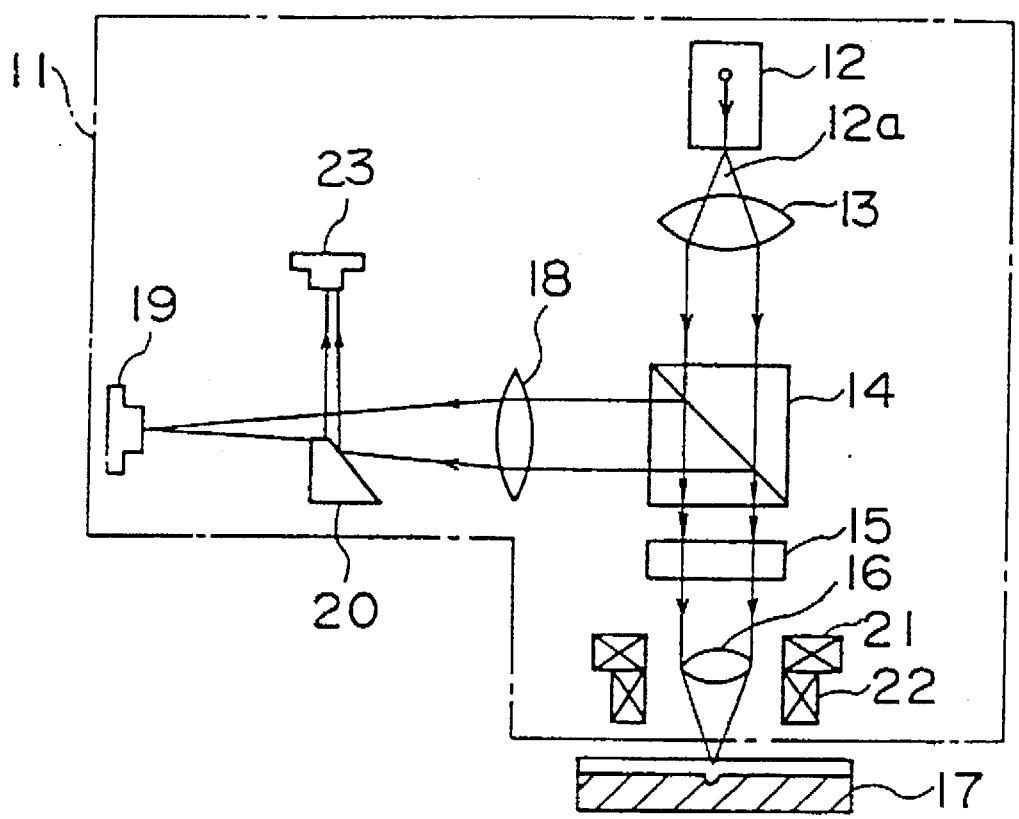
FIG. 1 shows a construction of an optical pickup mounted on a conventional optical disk drive.
Figure 2:
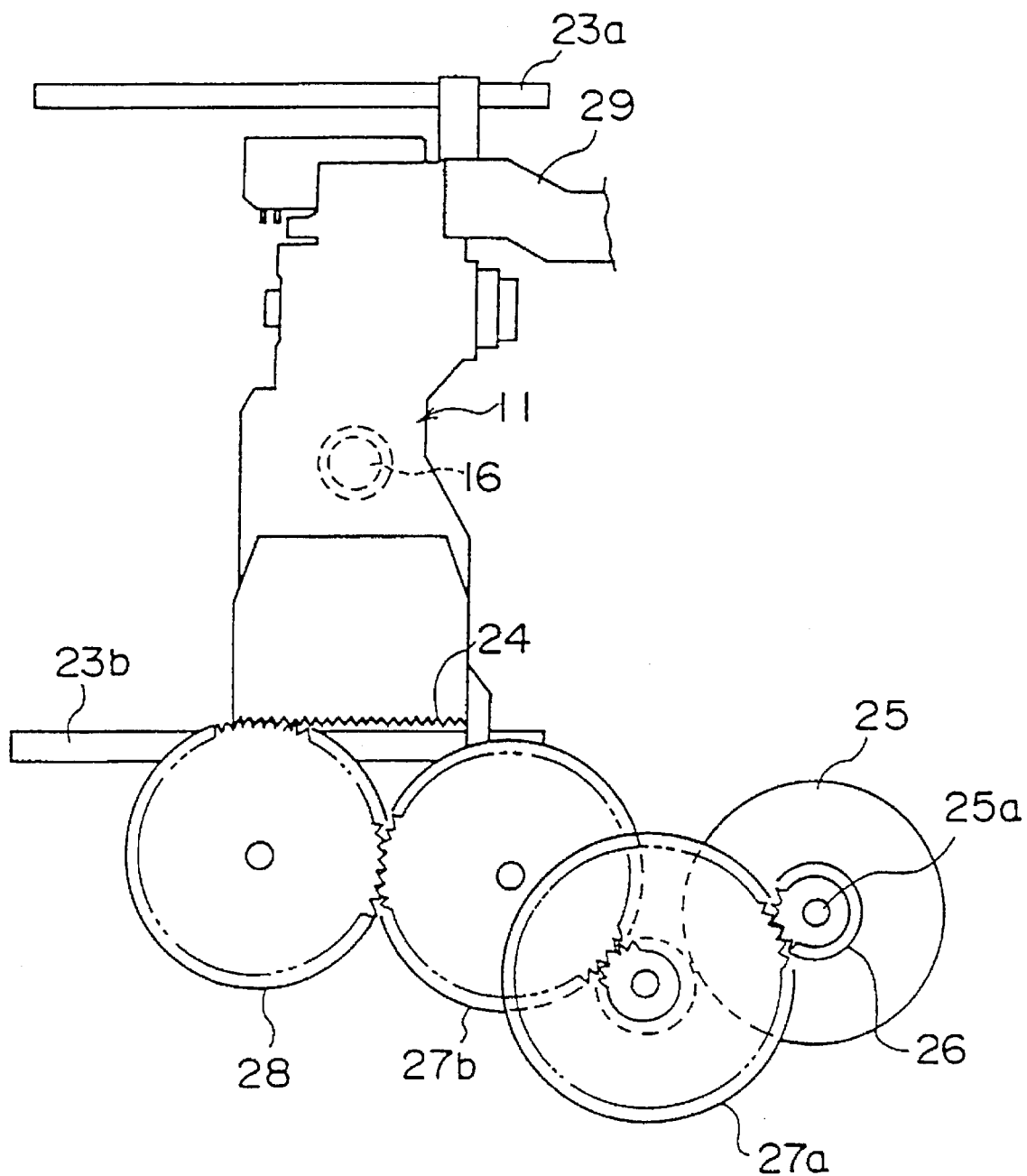
FIG. 2 is a diagram showing a principal idea behind an operation for driving the optical pickup of FIG. 1.
Figure 3:
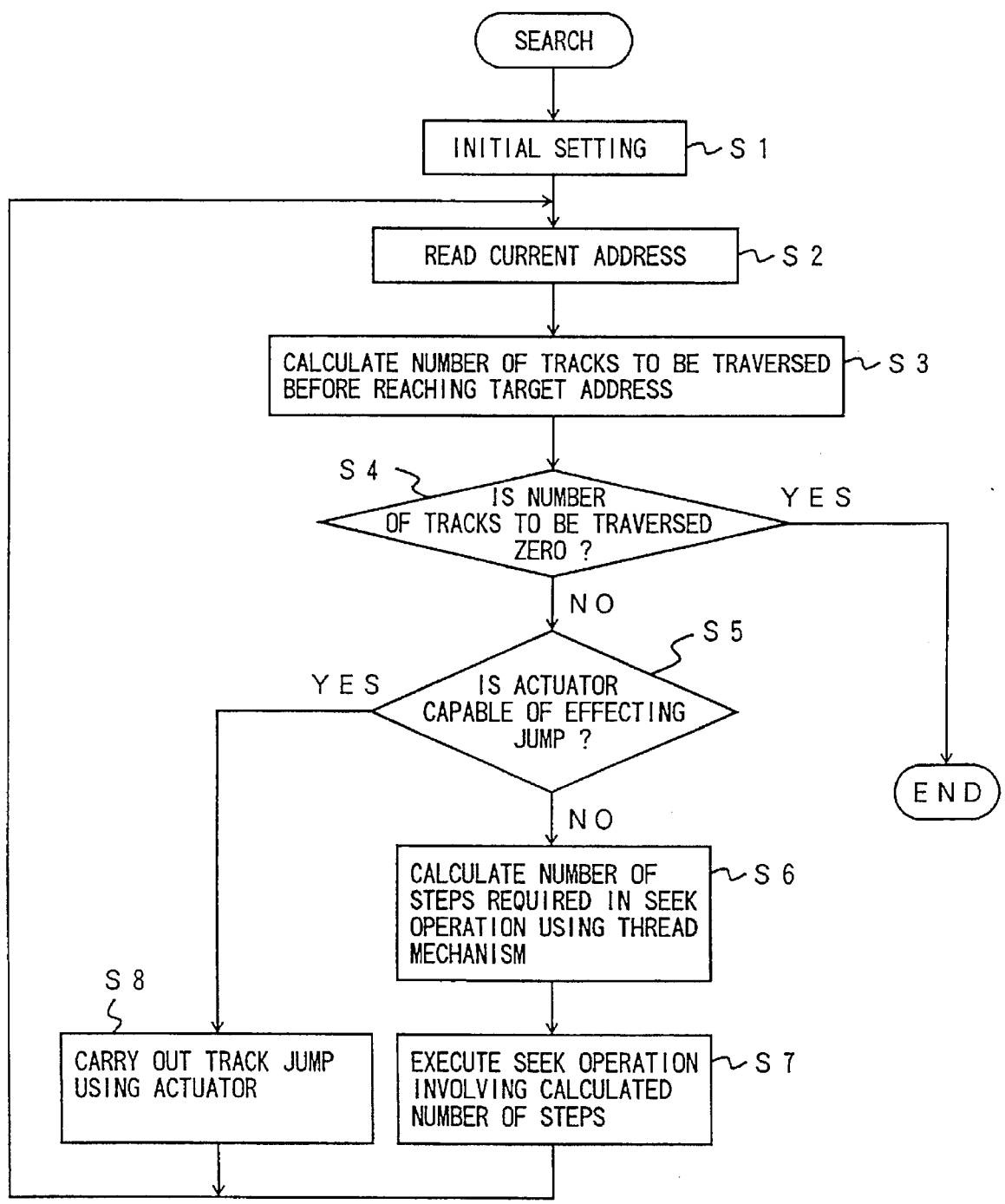
FIG. 3 is a flowchart showing a conventional operation for causing the optical pickup to jump across tracks.
Figure 8:
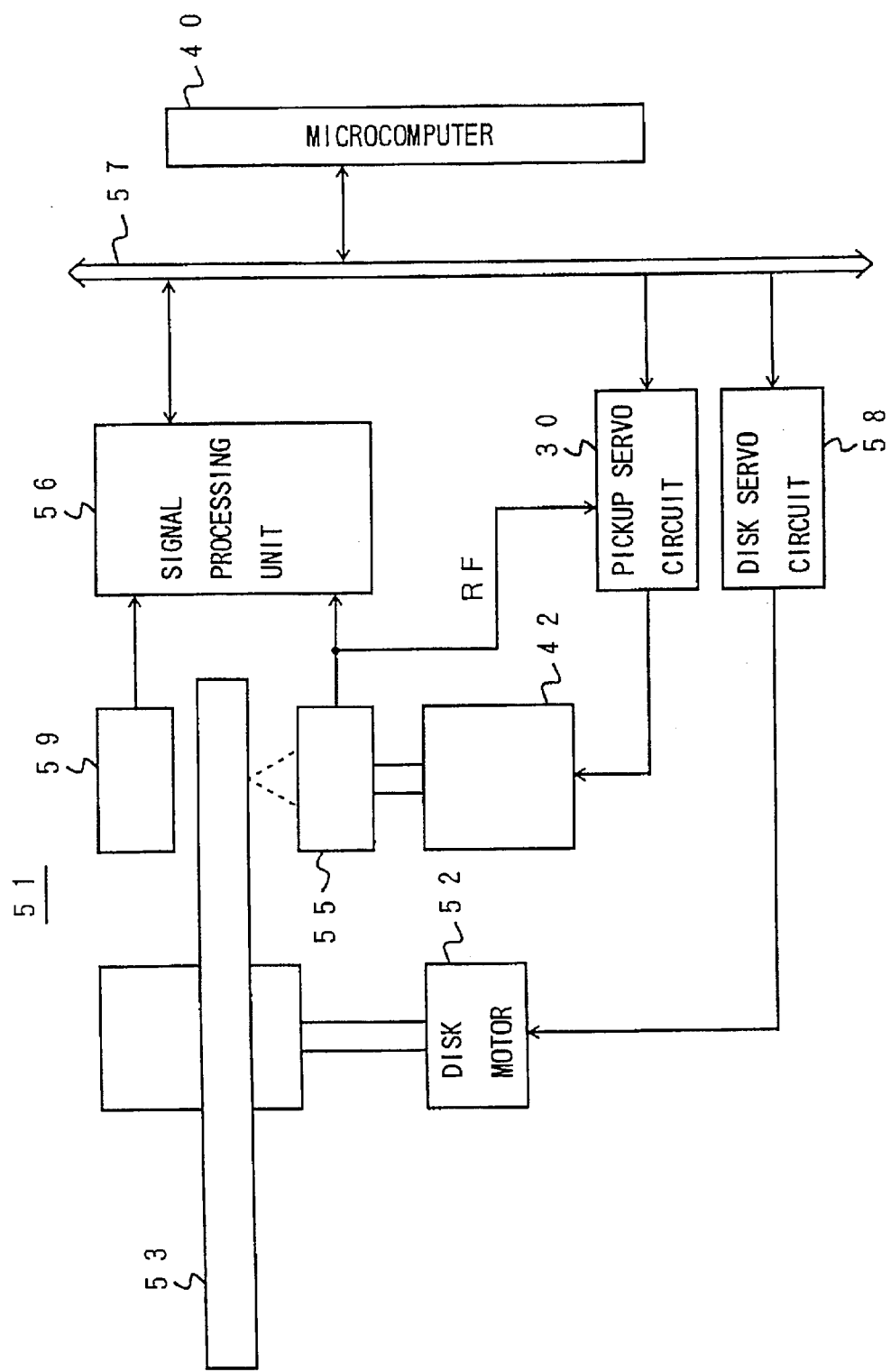
FIG. 8 is a block diagram of an optical disk drive.

FIG. 8 is a block diagram of an optical disk drive. In an optical disk drive 51 shown in FIG. 8, a laser beam is projected by an optical pickup 55 (having the construction as shown in FIG. 1) translated in a radial direction of an optical disk 53 by the feed motor 42 (translating means) to the optical disk 53 driven into rotating motion by a disk motor 52. A restored signal (RF) derived from a reflected beam is fed to a signal processing unit 56 comprising an analog waveform shaping circuit, a synchronization detection circuit, a PLL (phase locked loop) circuit, a signal processing circuit, a track address detection circuit and a head driving circuit and the like.

The PLL circuit compares a restored signal from the analog waveform shaping circuit with a reference signal from a built-in oscillator so as to generate restored clocks for use in demodulation. The synchronization detection circuit detects synchronization of a main signal using restored clocks from the PLL circuit and feeds the main signal to the signal processing circuit while maintaining pit synchronization.

The signal processing circuit is equipped with a function subjecting the main signal fed thereto to error correction, D/A conversion and the like. Address information extracted in this process is fed from a track address detection circuit to a microcomputer 40 (control means) via a bus 57. The signal processing circuit has a built-in memory for guarding against a skip in the sound by storing audio data for several second and reproducing the same when a skip or an interruption in the sound is created due to a disturbance in the oscillator.

The restored signal (RF) from the optical pickup 55 is fed to the pickup servo circuit 30 which is controlled by the microcomputer 40 via the bus 57. The pickup servo circuit 30 effects feed control of the optical pickup 55, focus control and tracking control on the basis of the restored signal (RF) from the optical pickup 55. The pickup servo circuit 30 executes controls by switching tracking polarity depending on whether pit scanning is being performed or groove scanning is being performed.

The disk motor 52 is controlled by a disk servo circuit 58 and effects CLV control of the optical disk 53 by generating a servo signal for controlling the optical disk 53 to be rotated at a constant linear velocity (CLV), using restored clocks from the signal processing unit (PLL circuit) 56 as a reference and by feeding the serve signal to the disk motor 52.

In a write operation, the signal processing unit 56 effects A/D conversion, data (audio data) compression, EFM modulation and the like so as to feed a main signal to the head driving circuit. In an MD, a writing operation is performed according to a magnetic field modulation using a head 59 provided above an upper surface of the optical disk 53 and exclusively used for recording. In this method, the head driving circuit controls and drives the head 59.

Like a compact disk, an MD (optical disk 53) enabling only a reading operation has a pit structure on the entirety of the area thereof. In an MD enabling both writing and reading operations, a read-in area thereof has a pit structure, and a write area and a read-out area have a groove structure.

In an MD enabling both writing and reading operations, the pit area and the groove area have respective tracking modes such that the tracking polarity is switched depending on whether the pit area is being processed or the groove area is being processed.

Figure 9A:
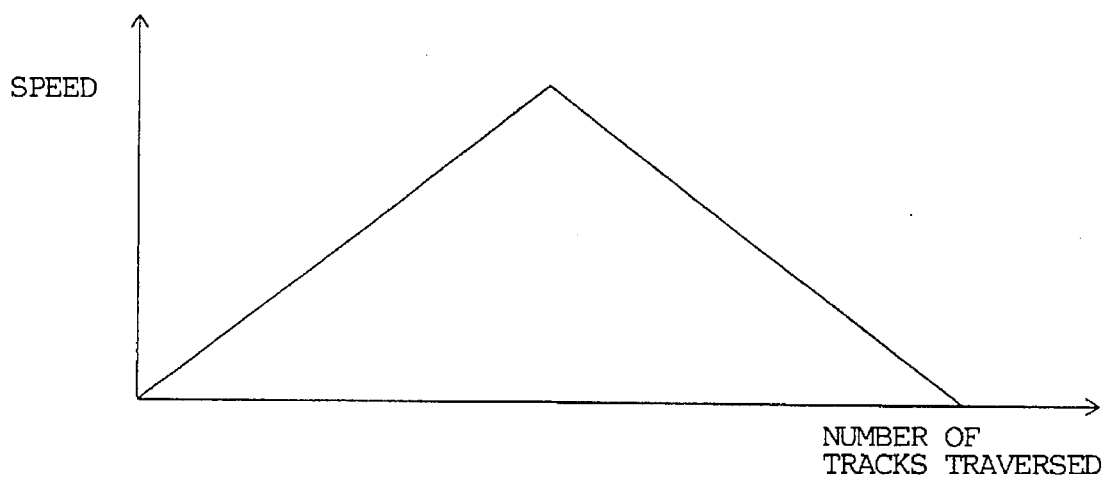
FIG. 9A shows a relationship between the number of tracks on an optical disk traversed by the optical pickup and a velocity of the optical pickup.
Figure 9B:
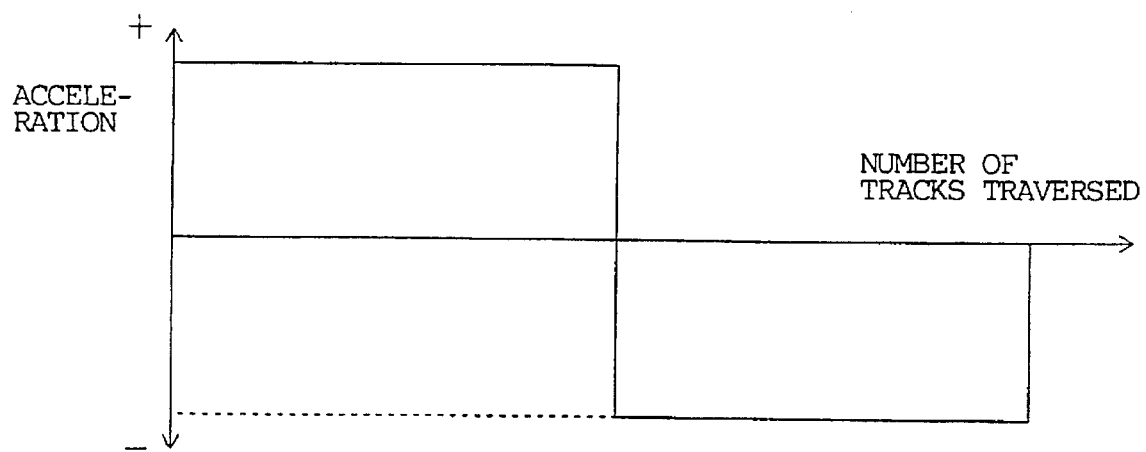
FIG. 9B shows a variation of an acceleration derived from the graph of FIG. 9A.

FIGS. 9A and 9B are graphs showing a variation of a speed of the optical pickup driven by the feed motor. FIG. 9A shows a relationship between the number of tracks on the optical disk 53 traversed by the optical pickup 55 and the velocity of the optical pickup 55. The velocity of the optical pickup 55 is increased until about half the total tracks have been traversed and is decreased beyond that point so that the optical pickup 55 is settled on a target address when its speed is zero.

FIG. 9B shows a variation of an acceleration derived from the graph of FIG. 9A. Again, it is demonstrated that the optical pickup 55 is accelerated as far as a midpoint, beyond which it is decelerated.

Figure 10:
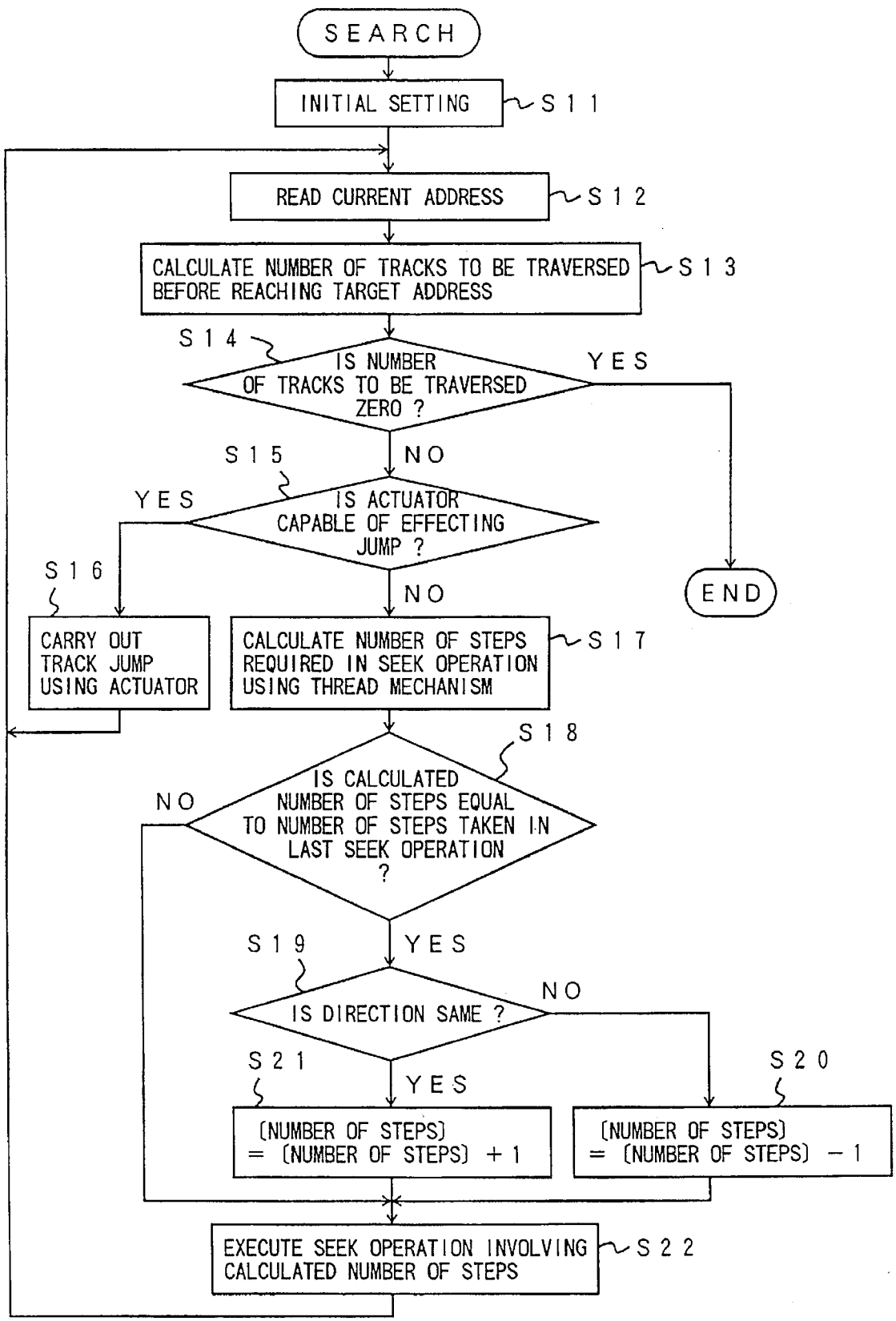
FIG. 10 is a flowchart of an operation of the present invention.

FIG. 10 is a flowchart of an operation of the present invention. Referring to FIG. 10, when a search operation is initiated in response to a seek command from the host system, the feed motor 42 is driven so as to translate the optical pickup 55 to an initially set (S11)-position. The microcomputer 40 reads an address at which the optical pickup 55 is currently located (S12), and calculates the number of tracks to be traversed before a target address is reached, starting from the address read by the microcomputer 40 (S13).

A determination is then made as to whether or not the number of tracks to be traversed in a seek operation is zero (S14). If the number of tracks to be traversed is zero, that is, if it is found that the optical pickup is already located on a target track, the search operation is terminated.

If the number of tracks to be traversed is not zero, a determination is made as to whether or not the actuator embodied by the tracking servo coil 37 provided in the optical pickup 55 is capable of effecting a jump across the tracks determined to be traversed (S15). If it is found that the actuator is capable of effecting a necessary jump across tracks, the coil 37 is fed a current so that a track jump using the actuator is carried out and the control is returned to S12 (S16).

If the actuator is not able to effect a necessary jump, the number of steps required in a seek operation using the motor 42 and a thread mechanism (rack-and-pinion mechanism) is calculated (S17).

A determination is then made as to whether or not the calculated number of steps is equal to the number of steps taken in a last seek operation using the thread mechanism (S18). If a negative answer is yielded in S18, a seek operation of the optical pickup 55 involving the calculated number of steps is executed (S22). If an affirmative answer is yielded in S18, a determination is made as whether or not the direction of translation is the same (S19), as by comparing the current and target addresses.

If it is determined that the direction of translation in the last seek operation differs from the current direction, that is, if the optical pickup 55 is translated in opposite directions successively, the calculated number of steps is decremented by one (S20). If it is determined that the optical pickup is translated in the same direction successively, the calculated number of steps is incremented by one (S21). The number of steps obtained after subtraction or addition is preset in the counter 39.

The feed motor 42 is driven according to the obtained number of steps so that the optical pickup 55 is translated to a target address (S22), and the control is returned to S12. Rotation of the feed motor 42 is detected by the rotation detector 43 as an FG signal. The FG signal output from the rotation detector 43 decrements the count of the counter 39. When the count of the counter 39 reaches zero, operation of the feed motor 42 is stopped.

Figure 6:
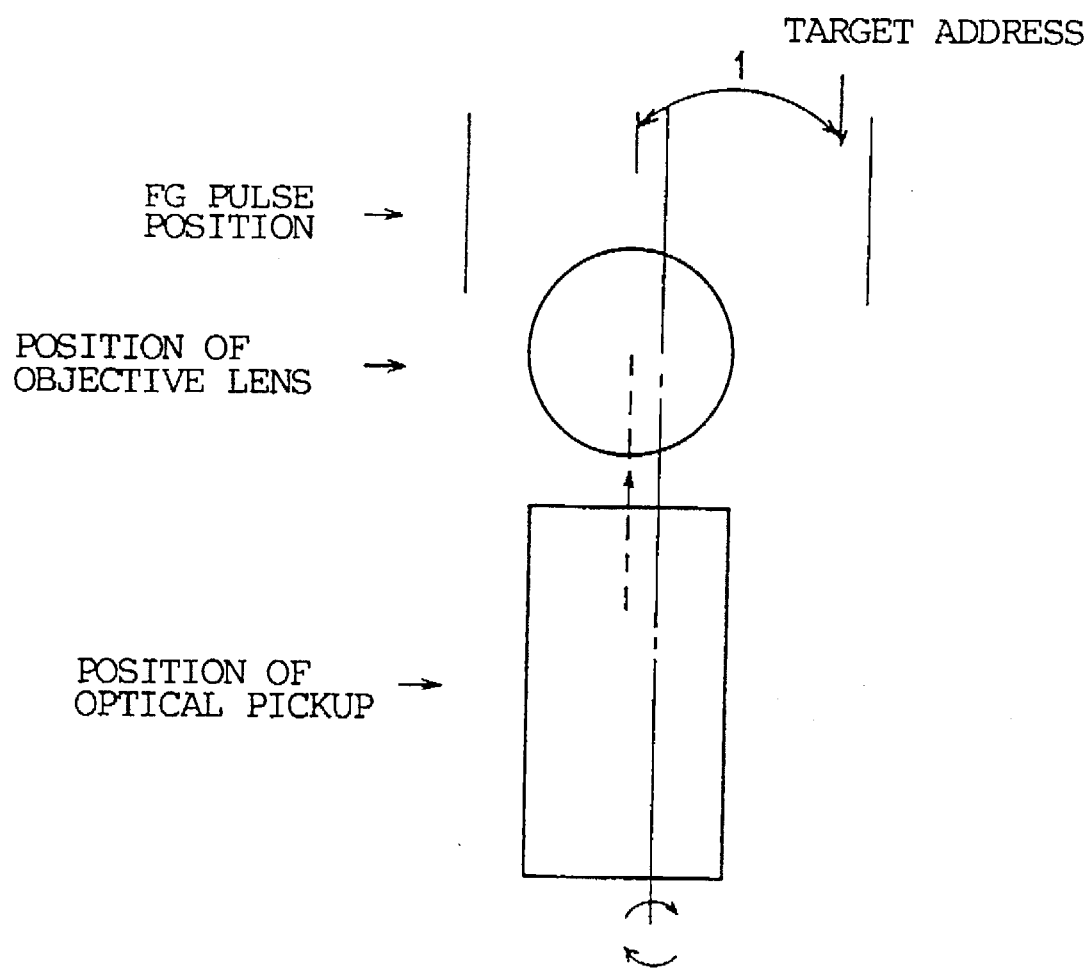
FIG. 6 is a diagram (2) explaining a problem with the conventional technology.

As a result, the optical pickup 55 is translated to a track containing a target address such that a reciprocating movement comes to a rest. In other words, occurrence of an endless loop as indicated in FIGS. 5 and 6 is prevented, and, substantially, only one additional step needs to be executed in translating the optical pickup once the optical pickup is brought to a stop. In this way, the search operation of the optical pickup 55 is stabilized.

While the optical disk 53 is embodied by a MD enabling both writing and reading operation in the above described embodiment, the present invention is applicable to optical disk drives using various types of optical disks including a compact disk.

The present invention is not limited to the above described embodiments, and variations and modifications may be made without departing from the scope of the present invention.

What is claimed is:

1. An optical pickup control for an optical disk drive, in which drive, information is written and read to and from the optical disk by translating the optical pickup in a radial direction of an optical disk and across tracks in the disk, and by executing focusing control and tracking control on a target track of the optical disk, said optical pickup having an optical mechanism in a main body, said optical pickup control comprising:

control means calculating the number of tracks to be traversed by said optical pickup based on an address of a current position of said optical pickup on the optical disk and a target address for the optical pickup, and calculating the number of steps to be taken in translating the main body of said optical pickup to the vicinity of the target address based on the calculated number of tracks to be traversed, a predetermined number of tracks comprising one translating step;

detecting means detecting the number of steps taken by the main body of said optical pickup;

driving means effecting a jump of the optical mechanism of said optical pickup across tracks of the optical disk based on a tracking error signal detected by said optical pickup from the optical disk;

adding/subtracting means modifying the number of steps to be taken in translating the main body of said optical pickup depending on the radial direction in which the main body of said optical pickup is to be translated; and translating means coupled to said detecting means and said adding/subtracting means, said translating means translating, based on an output from said adding/subtracting means, the main body of said optical pickup to a position in the vicinity of the target address, from which position it is possible for said driving means to move said optical pickup to the target address, the number of steps to be taken in the translation being calculated by said control means and modified by said adding/subtracting means, said adding/subtracting means subtracting a predetermined number from the number of steps calculated by the control means when the main body of said optical pickup is successively translated in mutually opposite radial directions on the optical disk and when the number of steps last taken in one of said directions is identical to the calculated number of steps to be taken in the other of said directions, and said adding/subtracting means adding said predetermined number to the number of steps calculated by the control means when the main body of said optical pickup is successively translated in a mutually identical radial direction on the optical disk and when the number of steps last taken in said direction is identical to the calculated number of steps to be taken in said direction.

2. The optical pickup control according to claim 1 wherein said adding/subtracting means adds/subtracts a predetermined number comprising one.

3. A method for controlling an optical pickup for an optical disk drive, in which drive, information is written and read to and from the optical disk by translating the optical pickup in a radial direction of an optical disk and across tracks in the disk, and by executing focusing control and tracking control on a target track of the optical disk, said optical pickup having an optical mechanism in a main body, said method comprising the steps of:

a) calculating the number of tracks to be traversed by said optical pickup based on an address of a current position of the optical pickup on said optical disk and a target address for the optical pickup;

b) determining whether or not it is possible to effect a track jump of the optical mechanism of said optical pickup based on a tracking error signal detected by said optical pickup from the optical disk;

c) calculating, when it is impossible to effect a track jump, the number of steps to be taken in translating the main body of said optical pickup to the vicinity of the target address, a predetermined number of tracks comprising one translating step;

d) subtracting a predetermined number from the number of steps calculated in step c) when the main body of said optical pickup is successively translated in mutually opposite radial directions on the optical disk and when the number of steps last taken in one of said directions is identical to the calculated number of steps to be taken in the other of said directions, and adding said predetermined number to the number of steps calculated in step c) when the main body of said optical pickup is successively translated in a mutually identical direction on the optical disk and when the number of steps last taken in said direction is identical to the calculated number of steps to be taken in said direction; and e) translating the main body of said optical pickup to a position in the vicinity of the target track based on the result obtained in step d).

4. The method according to claim 3 wherein step d) is further defined as subtracting or adding a predetermined number comprising one.

* * * * *